(12) United States Patent
Shinozaki et al.

(10) Patent No.: US 6,585,915 B2
(45) Date of Patent: Jul. 1, 2003

(54) PROCESS FOR PRODUCING A CARBON MATERIAL FOR AN ELECTRIC DOUBLE LAYER CAPACITOR ELECTRODE, AND PROCESSES FOR PRODUCING AN ELECTRIC DOUBLE LAYER CAPACITOR ELECTRODE AND AN ELECTRIC DOUBLE LAYER CAPACITOR EMPLOYING IT

(75) Inventors: Yasuo Shinozaki, Yokohama (JP); Kazuya Hiratsuka, Yokohama (JP); Katsuji Ikeda, Yokohama (JP)

(73) Assignees: Asahi Glass Company, Limited, Tokyo (JP); Kansai Netukagaku Kabushiki Kaisha, Amagasaki (JP)

( * ) Notice: Subject to any disclaimer, the term of this patent is extended or adjusted under 35 U.S.C. 154(b) by 137 days.

(21) Appl. No.: 09/822,343

(22) Filed: Apr. 2, 2001

(65) Prior Publication Data

US 2002/0096661 A1 Jul. 25, 2002

(30) Foreign Application Priority Data

Apr. 3, 2000 (JP) ......................................... 2000-100859

(51) Int. Cl.$^7$ .............................. H01B 1/04; H01M 4/58; H01G 9/00; C01B 31/00; B01J 20/20

(52) U.S. Cl. ........................ 252/502; 252/502; 423/414; 423/445 R; 429/231.8; 361/502; 361/503; 264/29.1

(58) Field of Search .............................. 423/414, 445 R; 252/502; 429/231.8; 361/502, 503, 508; 264/29.6, 29.7, 41, 198, 628; 502/416, 418

(56) References Cited

U.S. PATENT DOCUMENTS

| 3,539,467 | A | * | 11/1970 | Bozarth et al. | ............. | 502/429 |
| 5,304,527 | A | * | 4/1994 | Dimitri | ....................... | 502/425 |
| 5,877,935 | A | * | 3/1999 | Sato et al. | ................... | 361/502 |
| 6,413,486 | B2 | * | 7/2002 | Watanabe et al. | ....... | 423/445 R |

* cited by examiner

Primary Examiner—Mark Kopec
Assistant Examiner—Kallambella Vijayakumar
(74) Attorney, Agent, or Firm—Oblon, Spivak, McClelland, Maier & Neustadt, P.C.

(57) ABSTRACT

A process for producing a carbon material for an electric double layer capacitor electrode, including activating a graphitizable carbon or a graphitizable carbon source to have its pore volume in the range of 0.6 to 1.5 cm$^3$/g, and imparting mechanical impact force to the graphitizable carbon or the graphitizable carbon source activated in the activating step to reduce the pore volume to at most 75% of that before the mechanical impact force is imparted.

32 Claims, No Drawings

PROCESS FOR PRODUCING A CARBON MATERIAL FOR AN ELECTRIC DOUBLE LAYER CAPACITOR ELECTRODE, AND PROCESSES FOR PRODUCING AN ELECTRIC DOUBLE LAYER CAPACITOR ELECTRODE AND AN ELECTRIC DOUBLE LAYER CAPACITOR EMPLOYING IT

BACKGROUND OF THE INVENTION

1. Field of the Invention

The present invention relates to a process for producing a carbon material useful for an electrode for e.g. an electric double layer capacitor, a process for producing an electric double layer capacitor electrode and a process for producing an electric double layer capacitor. The electric double layer capacitor of the present invention can be widely used for power sources for portable apparatus, standby power sources for domestic electrical equipment, UPS for optical communication, power sources for electric automobiles and the like.

2. Discussion of Background

As an electric double layer capacitor, a coin type obtained in such a manner that an element having a pair of electrodes consisting mainly of activated carbon and formed on a current collector and a separator sandwiched therebetween, together with an electrolytic solution, is sealed in a metal casing by means of a metal lid and a gasket insulating the casing from the lid, and a wound type obtained in such a manner that a pair of sheet electrodes is wound by means of a separator interposed therebetween to obtain a wound element, which is accommodated in a metal casing together with an electrolytic solution, and sealed in the casing so that the electrolytic solution does not evaporate from an opening of the casing, have been known.

Further, for an application which requires a large current and a large capacitance, a stack type electric double layer capacitor having an element obtained by stacking a large number of sheet electrodes by means of a separator interposed therebetween, incorporated therein, has been proposed (JP-A-4-154106, JP-A-3-203311, JP-A-4-286108). Namely, a plurality of sheet electrodes formed into a rectangle as positive electrodes and negative electrodes, are alternately stacked one on another by means of a separator interposed therebetween to obtain a stacked element, a positive electrode lead material and a negative electrode lead material are connected with the respective terminals of the positive electrodes and the negative electrodes by caulking, and the element in such a state is accommodated in a casing, impregnated with an electrolytic solution and sealed with a lid.

Conventionally, an electrode constituting an electric double layer capacitor has been one made mainly of activated carbon having a large specific surface area, and as the electrolytic solution, a solvent having a high dielectric constant such as water or propylene carbonate has been used so as to dissolve an electrolyte at a high concentration.

In such an electrode made mainly of activated carbon, the charge of an electric double layer formed on the surface of the activated carbon itself contributes to the capacitance of the electric double layer capacitor, and thus activated carbon having a large specific surface area has been employed.

Activated carbon is produced usually by carbonizing and activating a carbon source derived from a plant such as sawdust or coconut shell, a carbon source derived from a coal/petroleum material such as coke or pitch, or a synthetic high polymer carbon source such as a phenolic resin, a furfuryl alcohol resin or a vinyl chloride resin.

The carbonization is carried out usually by heating a carbon source in a non-oxidizing atmosphere at a temperature of from 300° C. to 2,000° C. The activation is carried out by heating the carbonized product thus obtained in a weak oxidizing gas containing carbon dioxide or water vapor to a temperature of from 500° C. to 1,100° C., so as to oxidize and exhaust the carbonized product to being it to have a porous structure and to increase its surface area. Otherwise, the carbonized product is mixed with an alkali metal hydroxide (such as KOH) in an amount of several times the mass of the carbonized product, and then the mixture is heated at a temperature of from the melting point of said metal hydroxide to 1,000° C. in an inert atmosphere for from several tens minutes to 5 hours so as to increase the surface area. Since the alkali metal hydroxide may cause deterioration in durability of an electric double layer capacitor, it is removed by adequate washing after the activation. Here, in the present specification, "from A to B (A and B are numerical values)" means at least A and at most B.

As important performances required for an electric double layer capacitor, a) a large capacitance, b) a high energy density, c) a high durability when charging and discharging cycles are repeated, and d) a low internal resistance, may, for example, be mentioned. Among these properties required, as an electrode material presenting a large capacitance, activated carbon obtained by activating a carbon material derived from pitch by heating in the coexistence of an alkali metal hydroxide (alkali activation) or activated carbon obtained by activating a carbon material derived from coke by an alkali has been reported (JP-A-5-258996, JP-A-10-199767, JP-A-63-78513, JP-A-10-199767, JP-A-11-31637). Particularly, it is reported that activated carbon obtained by alkali activation of a carbon material having a relatively developed crystallinity, such as pitch showing optical anisotropy i.e. so-called mesophase pitch as a carbon source, has a large capacitance per mass, and has a relatively high bulk density, and accordingly, when the activated carbon is formed into an electrode, said electrode has a high density, whereby an electric double layer capacitor having a large capacitance per unit volume can be obtained (JP-A-2-185008, JP-A-10-121336).

Further, activated carbon obtained by water vapor activation or alkali activation of a carbon material having a relatively low crystallinity, such as a thermosetting resin such as a phenol resin or pitch showing optical isotropy, as a carbon source, to bring the specific surface area to be high, has a large capacitance per unit mass, and has a high durability when charging and discharging are repeated for a long period of time. However, as the bulk density of the activated carbon is low, the capacitance per unit volume tends to be small.

In general, it tends to be difficult to increase the specific surface area of a carbon material having a developed crystallinity by activation by an oxidizing gas such as water vapor (gas activation), and accordingly activation by using a chemical (chemical activation) is employed to increase the surface area. Particularly, an alkali activation employing an alkali metal hydroxide as a chemical is frequently employed. Although the mechanism of the activation by an alkali metal hydroxide is not clearly understood in detail for the most part, it is considered that, in a case of an activation by KOH for example, KOH infiltrates into between carbon layers at a relatively low temperature of from 400 to 500° C., and during this step, carbonation of carbon and gasification of carbon with generated water or carbonic acid gas takes place, whereby carbon is consumed to increase the specific surface area, and metal potassium generated by reduction of KOH is intercalated into between carbon layers to weaken the bonding force between carbon layers (New Edition Activated Carbon, Yuzo Sanada, Kodansha Ltd. Publishers, Scientific). It is considered that in such an activated carbon subjected to alkali activation, bonding force between carbon layers becomes weak as mentioned above, and accordingly when it is used as an electrode for an electric double layer capacitor, not only ions are adsorbed into pores in the activated carbon but a part of ions is adsorbed into pores to widen the space between carbon layers at the time of charging, to present the capacitance.

When the above-mentioned known activated carbon is used for an electrode for an electric double layer capacitor, the capacitance per unit mass of the electrode will be relatively large, but the bulk density tends to be low since the pore volume of the activated carbon is large, whereby when an electrode is prepared by using this activated carbon, it tends to be difficult to fill an adequate mass of activated carbon per unit volume of the electrode, and no electrode having an adequately large capacitance per volume is obtained. Further, in the case of the activated carbon obtained by alkali activation, as easily estimated from the mechanism of the activation, it is very difficult to remove the alkali metal element by washing since it is deeply dispersed and infiltrated into the skeleton of the carbon material. According to the studies by the present inventors, the durability of a capacitor tends to be poor if a large amount of an alkali metal is remaining in an activated carbon electrode.

SUMMARY OF THE INVENTION

Under these circumstances, the present invention has been made to overcome the above problems of prior art, and it is an object of the present invention to provide a process for producing a carbon material having a large capacitance per unit volume and a process for producing an electric double layer capacitor having a large capacitance and a high durability using said carbon material as an electrode material.

According to the present invention, a process for producing a carbon material for an electric double layer capacitor electrode, a process for producing an electric double layer capacitor electrode and a process for producing an electric double layer capacitor are provided.

According to the present invention, there is provided a process for producing a carbon material for an electric double layer capacitor electrode, which comprises:
1) a step of activating a graphitizable carbon or a graphitizable carbon source to bring its pore volume to be from 0.6 to 1.5 $cm^3/g$; and
2) a step of imparting mechanical impact force to the graphitizable carbon or the graphitizable carbon source activated in the above step 1) to reduce the pore volume to at most 75% of that before the mechanical impact force is imparted.

Further, according to the present invention, there is provided a process for producing a carbon material for an electric double layer capacitor electrode, which comprises:
1) a step of activating a graphitizable carbon or a graphitizable carbon source to bring its pore volume to be from 0.6 to 1.5 $cm^3/g$; and
2) a step of imparting mechanical impact force to the graphitizable carbon or the graphitizable carbon source activated in the above step 1) to reduce the pore volume to at least 0.1 $cm^3/g$ and less than 0.6 $cm^3/g$.

Further, according to the present invention, there is provided a process for producing an electric double layer capacitor electrode, which comprises forming a carbon material obtained by the above process and a binder into the electrode.

Further, according to the present invention, there is provided a process for producing an electric double layer capacitor comprising the electric double layer capacitor electrode obtained by the above process.

As mentioned previously, with respect to an existing electrode material for an electric double layer capacitor represented by activated carbon, an adequate capacitance per mass can be obtained basically when the specific surface area is large, but activated carbon having a large specific surface area usually has a large pore volume, whereby the mass of activated carbon to be filled per unit volume tends to decrease, and accordingly the capacitance per volume will not increase so much. The present inventors have conducted studies to impart mechanical impact force to such an existing activated carbon by a planetary mill to reduce the pores so that the bulk density of an electrode employing said activated carbon is increased and the capacitance per volume is thereby increased. However, the capacitance per mass of such a conventional activated carbon decreases along with decrease in the pore volume, and no electrode having a large capacitance per volume can be obtained, although the density of the electrode employing this activated carbon can be increased.

The present invention has been accomplished on the basis of such discoveries that, with respect to a graphitizable carbon material having a relatively large pore volume, obtained by activation particularly by alkali activation, the capacitance per mass does not significantly decrease even when the pore volume is reduced by imparting mechanical impact force, and accordingly the bulk density of an electrode consisting mainly of this carbon material can be increased while maintaining a large capacitance per mass.

The carbon material obtained by the process of the present invention has a large capacitance per mass and a relatively small pore volume as compared with a conventional activated carbon, and accordingly the electrode density can be increased and the capacitance per volume can be increased resultingly.

DETAILED DESCRIPTION OF THE PREFERRED EMBODIMENTS

According to the present invention, the carbon material for an electric double layer capacitor electrode can be produced by
1) a step of activating a graphitizable carbon or a graphitizable carbon source to bring its pore volume to be from 0.6 to 1.5 $cm^3/g$; and
2) a step of imparting mechanical impact force to the graphitizable carbon or the graphitizable carbon source activated in the above step 1) to reduce the pore volume to at most 75% of that before the mechanical impact force is imparted.

Otherwise, according to the present invention, the carbon material for an electric double layer capacitor electrode can be produced by
1') a step of activating a graphitizable carbon or a graphitizable carbon source to bring its pore volume to be from 0.6 to 1.5 $cm^3/g$; and
2') a step of imparting mechanical impact force to the graphitizable carbon or the graphitizable carbon source activated in the above step 1) to reduce the pore volume to at least 0.1 cm$^3$/g and less than 0.6 cm$^3$/g.

The carbon material obtained by the process of the present invention is characterized by that it has a pore volume of preferably at least 0.1 cm$^3$/g and less than 0.6 cm$^3$/g, more preferably at least 0.2 cm$^3$/g and less than 0.6 cm$^3$/g, and has a pore volume smaller than that of a conventional carbon material to be used for an electric double layer capacitor electrode, so as to obtain a high electrode density. If the pore volume is smaller than the above range, the capacitance per mass tends to decrease, and if it is larger than the above range, the electrode density will not be increased.

Further, the carbon material obtained by the process of the present invention has a mean particle diameter of preferably from 2 to 20 μm, more preferably from 3 to 10 μm. If the mean particle diameter is smaller than the above range, the density of the electrode tends to be too high, and the mobility of an electrolytic solution in the inside of the electrode layers tends to decrease, whereby the internal resistance of the capacitor tends to increase, and further, an impalpable powder of less than 1 μm tends to increase, and accordingly the impalpable powder is likely to drop from the electrode, and the leakage current tends to increase. If the mean particle diameter is larger than the above range, particles of the carbon material are likely to aggregate one another in the inside of the electrode layers to form a large space in the electrode layers, whereby the electrode density is less likely to increase.

The carbon material to be used as a material in the present invention is preferably a graphitizable carbon. Carbon materials are roughly classified into a graphitizable carbon which will have a graphite structure when heated to a high temperature of a level of 3,000° C. and a hardly graphitizable carbon which will not have a complete graphite structure. Among these two types of carbon materials, it is preferred to use a graphitizable carbon in the present invention, since the capacitance per mass of the hardly graphitizable carbon significantly decreases after the treatment carried out in the process of the present invention to reduce the pore volume by imparting mechanical impact force, whereas the capacitance per mass of the graphitizable carbon does not significantly decrease after the treatment to reduce the pore volume.

As a graphitizable carbon source which forms such a graphitizable carbon by heating at a high temperature, a common thermoplastic resin such as a vinyl chloride type resin, polyacrylonitrile, a butyral resin, a polyacetal resin, a polyethylene resin, a polycarbonate resin or a polyvinyl acetate resin may, for example, be mentioned. By heating such a carbon source at from 500 to 1,100° C., a graphitizable carbon can be obtained. Further, a pitch type material such as a petroleum type pitch or a coal type pitch or coke obtained by subjecting such a pitch to a heat treatment may also be mentioned as a preferred graphitizable carbon source in the present invention. A coke is preferred in view of a low cost and a stable supply in the market. A petroleum coke or a coal pitch coke has a relatively small amount of a volatile component at a level of from several percent to several tens percent and has considerably been carbonized, and thus it can be subjected to an activation treatment as it is. However, it is preferred to further heat such a coke in a non-oxidizing atmosphere to bring the volatile component to be from 1 to 5 mass % and to activate the carbonized product thus obtained, whereby a carbon material which has a large capacitance and of which the capacitance is less likely to decrease even when subjected to a treatment to reduce the pore volume after the activation, will be obtained. Here, in the present specification, "mass %" means mass ratio in percentage.

In the present invention, the graphitizable carbon obtained by carbonizing the above graphitizable carbon source or a graphitizable carbon source having a small amount of a volatile component is activated as it is. As the activation, a common activation method may be applicable, but preferred is a chemical activation of subjecting the carbon material and a chemical to a heat treatment, particularly preferred is alkali activation using an alkali metal compound as the chemical. In the case of the alkali activation, as the alkali metal compound, an alkali carbonate such as potassium carbonate or sodium carbonate may be used, but it is preferred to use at least one type of an alkali metal hydroxide such as potassium hydroxide, sodium hydroxide, lithium hydroxide, rubidium hydroxide or cesium hydroxide, and particularly preferred is potassium hydroxide.

Such an alkali metal compound is added and mixed in an amount of from 0.2 to 5.0 times the mass of the carbon or carbon source as the material, followed by heating at a temperature of the melting point of the alkali metal hydroxide or above, preferably from 300 to 1,000° C., more preferably from 500 to 900° C., for from 30 minutes to 10 hours in a non-oxidizing atmosphere. The alkali metal compound decomposes at the above temperature, and the resulting alkali metal strongly erodes the carbon material to weaken the bonding force between layers of the crystals of the carbon material, and at the same time, a complexly developed porous structure is formed in the carbon material, whereby the pore volume will increase. In the present invention, the pore volume is brought to be from 0.6 to 1.5 cm$^3$/g by suitably changing the temperature, the time or the mixture ratio of the alkali metal compound to the carbon material during activation.

If the pore volume of the carbon material is smaller than the above range after completion of the activation, adsorption of electrolytic ions hardly takes place when a capacitor is constituted, whereby the capacitance tends to decrease. Further, if the pore volume is larger than the above range, although the capacitance tends to increase, the electrically conducting path in the carbon material will be cut off, whereby the internal resistance tends to increase when a capacitor is constituted.

Here, the activation in the present invention means a treatment to increase the pore volume by applying a treatment to the carbon material, and it is not limited to the method as disclosed in the present specification so long as the pore volume can be increased.

The alkali metal in the carbon material after the alkali activation is washed off with water or neutralized by e.g. an acid, and the carbon material is washed with water and adequately dried.

The carbon material obtained by the process of the present invention contains an alkali metal as an impurity in an amount of preferably at most 2,000 ppm, more preferably at most 1,500 ppm, furthermore preferably at most 500 ppm. A part of the alkali metal contained in the carbon material obtained by the process of the present invention is originally contained in the material as the carbon source, but most of it is incorporated in the carbon material when the carbon material and the alkali metal compound are mixed and subjected to a heat treatment. Most of the alkali metal incorporated in the carbon material can be removed by the following washing treatment, but if the washing treatment is inadequate, the residual amount of the alkali metal exceeds 2,000 ppm, which may cause deterioration in durability due to reaction of the alkali metal with an electrolytic solution when a capacitor cell is constituted.

Further, of the carbon material obtained by the process of the present invention, the amount of functional groups on the surface is preferably from 0.1 to 0.5 meq./g, more preferably from 0.2 to 0.4 meq./g. If the amount of functional groups on the surface is larger than the above range, the capacitance tends to increase, but the cell internal pressure tends to significantly increase due to generation of gas when a capacitor cell is constituted, whereby a long term durability may be impaired. If the amount of functional groups on the surface is smaller than the above range, the capacitance may decrease.

With respect to the carbon material obtained by the process of the present invention, the amount of functional groups on the surface increases during the treatment to reduce the pore volume by imparting mechanical impact force, which may deteriorate durability of the capacitor cell, and accordingly it is very important to control the amount of functional groups on the surface. In the present invention, the amount of functional groups on the surface of the carbon material is controlled preferably by carrying out a heat treatment under vacuum or in an inert atmosphere of e.g. nitrogen gas at a temperature of at least 300° C. and less than 750° C. for from 10 minutes to 10 hours, after the treatment to reduce the pore volume is carried out by imparting mechanical impact force to the carbon material.

It is preferred to control the amount of functional groups on the surface of the carbon material obtained by the process of the present invention from the above reasons, but the amount of functional groups on the surface may be within the above preferred range as it is in some cases depending upon the type of the carbon material or the conditions of the heat treatment with the alkali metal compound, and it is not necessary to apply a heat treatment in such a case. Here, the fact that the durability of a capacitor cell tends to be poor when the amount of functional groups on the surface is large has already been reported (Denki Kagaku (Electrochemistry) vol 59, No. 7, 1991, p607–613).

As reasons why it is preferred to provide such a lower limit of the amount of functional groups on the surface of the carbon material of the present invention, the following may be mentioned. Namely, it is considered that by mixing the alkali metal compound and the carbon material, followed by heat treatment, the alkali metal is dispersed into between layers of micro graphite crystals in the carbon material to weaken the bonding force between layers and to newly form a surface to be the site to present the capacitance of an electric double layer capacitor. In the present invention, the amount of functional groups on the surface is decreased preferably by applying a heat treatment to the carbon material after the activation, washing and the treatment to reduce the pore volume are completed. However, if the heat treatment temperature is raised, the surfaces newly formed as mentioned above are strongly bonded each other again to excessively reduce the site to present capacitance of an electric double layer capacitor. Accordingly, although the amount of functional groups on the surface is reduced, the capacitance tends to decrease. Further, the pore volume of the carbon material slightly decreases during such a heat treatment in some cases, but there will be no problem when used for a capacitor electrode so long as the pore volume is from 0.6 to 1.5 cm$^3$/g as measured after the heat treatment.

In the process for producing the carbon material of the present invention, mechanical impact force is imparted to the carbon material after the activation and washing are completed, to reduce the pore volume to at most 75%, preferably at most 60%, of that before the mechanical impact force is imparted, or to the absolute value after the treatment to reduce the pore volume of at least 0.1 cm$^3$/g and less than 0.6 cm$^3$/g. The carbon material after the activation has a large capacitance per mass, but has a large pore volume, and accordingly when said carbon material is mixed with a binder and formed into a sheet to obtain an electrode, its bulk density can be brought to be less than 0.6 g/cm$^3$ at highest. Accordingly, since the capacitance per volume can not be increased, the pore volume has to be reduced so as to increase the electrode density. If the pore volume after the treatment to reduce the pore volume is larger than 75% of that before mechanical impact force is imparted, or if the absolute value of the pore volume after the treatment to reduce the pore volume is larger than 0.6 cm$^3$/g, an effect to increase the electrode density tends to be small. Further, if the absolute value of the pore volume after the treatment to reduce the pore volume is smaller than 0.1 cm$^3$/g, although the electrode density may be high, the capacitance per mass of the carbon material will significantly decrease, whereby the capacitance per volume of the electrode decreases on the contrary.

Here, the treatment to reduce the pore volume is, specifically, a treatment of imparting mechanical impact force to the porous carbon material formed in the activation step to break a part of pores to convert the carbon material into a less bulky carbon material. In this step, micropores having a diameter of at most 1 nm, in which common organic electrolyte (such as quaternary ammonium salt) ions are hardly adsorbed, and which is considered to make substantially no contribution to development of the capacitance, are broken by priority.

As a means of imparting mechanical impact force, various ones may be considered, and it is possible to use, for example, a Dodge crusher, a double-roll crusher, an edge runner, a jaw crusher, a cone crusher, a hammer mill, a rotary crusher, a desk crusher, a rod mill, a ball mill, a vibration mill, a planetary mill, a tube mill, a roller mill, an attrition mill, a jet mill, a micron mill or a micromizer. However, the principal purpose of this step is not to reduce the particle diameters of the carbon material, but to break the pores to reduce the pore volume. Accordingly, an apparatus capable of imparting as strong impact force as possible to the powder is preferred. Namely, it is preferred that an impact force exceeding 1 G, preferably exceeding 1.5 G, is imparted, where the unit of the impact force is represented by the acceleration of gravity G, and a preferred apparatus may, for example, be a planetary mill, a vibration mill or an attrition mill. The impact force is preferably at most 20 G, whereby the apparatus will not be under the overload. In a case of a grinder using a grinding medium, it is preferred to use a medium having a large specific gravity so that the impact force is as strong as possible. As a suitable medium, zirconia, alumina, tungsten carbide or steel may, for example, be mentioned. However, materials of inner surface of the grinder and the grinding medium tend to be mixed in the carbon material as impurities during the treatment, and accordingly they are more preferably made of materials which are electrochemically stable when a capacitor cell is constituted. As an electrochemically stable material, an oxide type ceramic may be mentioned. The medium may have any of e.g. spherical, rods and polyhedral shapes, but preferably it is spherical balls, since the application efficiency of the impact energy tends to be high and the medium material is less likely to be mixed in the carbon material.

The treatment to reduce the pore volume may be carried out by using an apparatus with an acceleration of gravity of at most 1 G when mechanical impact force is imparted (such as a rotary ball mill), but the treatment time tends to be long since the impact energy is small. Further, the carbon material tends to be excessively fine (ground) before the pore volume is not so reduced, and the particle diameters suitable for forming an electrode may not be obtained, and accordingly such an apparatus has many demerits as compared with an apparatus capable of imparting a strong mechanical impact force such as a vibration mill, a planetary mill or an attrition mill.

The treatment to reduce the pore volume may basically be carried out either by a dry method or by a wet method of carrying out a treatment in a state of a slurry obtained by mixing the carbon material with a solvent such as water or ethanol. However, a dry method is more preferred since in a wet method, the particle diameters tend to be small before the pore volume will not reduce, and the solvent has to be reduced after the completion of the treatment, whereby the process tends to be complicated. In a case of carrying out the treatment by a dry method, the fluidity of the powder may be extremely high depending upon the properties of the carbon material. In such a case, in the moment that the grinding medium particles collide with the carbon material to impart an impact force, the carbon material is pushed out from the gap in the medium particles, and the medium particles are likely to directly collide with one another, whereby the efficiency in reduction of pore volume tends to decrease, and contamination of the carbon material due to separation of fine powder from the medium tends to be significant in some cases. In such a case, it is preferred to add a treatment assistant in an amount of at most 20 mass %, preferably at most 10 mass %, based on the mass of the carbon material. As the treatment assistant, water, an organic solvent such as an alcohol or a lubricant such as a stearate may be mentioned. By adding a small amount of such an assistant, the fluidity of the carbon material powder tends to be slightly poor and the powder tends to attach to the treatment medium (such as grinding balls), and accordingly the impact force at the time of collision of the medium particles is likely to be transmitted to the carbon material with a high efficiency, and the contamination from the medium tends to decrease.

The time required for the treatment to reduce the pore volume varies depending upon e.g. the type of the treatment apparatus, the specific gravity of the medium or the charge ratio of the medium to the carbon material, and can not necessarily be determined, but the treatment is preferably completed within 24 hours, particularly within 12 hours, to prevent the particle diameters of the carbon material from being excessively small. Accordingly, it is preferred to impart as high acceleration of gravity as possible to the best of the apparatus's ability.

The treatment by a dry method may be carried out in the air, but it is preferably carried out in an inert atmosphere of e.g. nitrogen gas or argon, since functional groups may be formed on the surface newly formed by grinding of the carbon material.

The pore volume of the carbon material of the present invention is a value measured by Autosorb-1 manufactured by Quantachrome or an apparatus having similar functions, as follows.

The pore volume is represented by a volume of liquid nitrogen obtained in such a manner that nitrogen gas is adsorbed in a sample preliminarily dried under vacuum at 200° C. for at least 12 hours, at a temperature of liquid nitrogen to obtain an adsorption isotherm, from which the amount of nitrogen gas absorbed at a relative pressure of 0.995 is obtained and calculated as the volume of liquid nitrogen.

The particle diameter of the carbon material in the present invention is obtained in such a manner that about 0.1 g of a powder of the carbon material is charged into 50 $cm^3$ of ethanol firstly, followed by irradiation with an ultrasonic wave at a frequency of 43 KHz with an output of 45 W for at least 10 minutes, then measurement by a laser scattering method (by using Microtrack Model 2 granulometer, manufactured by Leed and northrup) is carried out, and the result is represented by the particle diameter at the accumulated volume of 50% (D50).

The amount of functional groups on the surface of the carbon material obtained by the present invention is measured as follows.

(1) A 0.5 mol/l NaOH aqueous solution is prepared, which is subjected to neutralization titration with a 0.1 mol/l HCl aqueous solution to obtain a factor.

(2) To the above NaOH aqueous solution, 1 g of a carbon material dried under vacuum at 150° C. for at least 5 hours is added, followed by shaking at 20° C. for 24 hours.

(3) The carbon material is collected by filtration from the above shaked liquid, and the filtrate is subjected to neutralization titration with the above 0.1 mol/l HCl aqueous solution used in step (1) to obtain a factor.

(4) From the difference between the factors obtained in step (1) and (3), the amount of functional groups on the surface of the carbon material is calculated. The calculation method is disclosed in Journal of Carbon (vol 32, No. 5, p759–769, 1994).

The amount of the alkali metal contained in the carbon material obtained by the process of the present invention is analyzed by the following means. Firstly, the carbon material is put in a high pressure container of a microwave sample decomposition apparatus, nitric acid is added thereto, followed by irradiation with a microwave with a low output, and the inside of the container is made to be in high temperature and high pressure conditions so that the carbon material undergoes oxidative destruction, and this operation is repeatedly carried out several times, then a microwave output is gradually increased while successively adding sulfuric acid and perchloric acid to completely decompose the carbon material. It is confirmed that the carbon material is completely decomposed and no residue is present, then the liquid after decomposition is determined by ICP emission spectrometry.

According to the present invention, an electrode for an electric double layer capacitor can also be provided, which contains the carbon material obtained by the above-mentioned production process and a binder, which may further contain an electrical conductivity-imparting material as the case requires, and which has a bulk density of preferably from 0.6 to 1.0 $g/cm^3$. The reason why the bulk density of the electrode is within the above range is that no adequate capacitance per volume tends to be obtained if the bulk density is lower than 0.6 $g/cm^3$, and if the bulk density is higher than 1.0 $g/cm^3$, the resistance of a capacitor cell tends to be high, although the capacitance per volume tends to increase.

The carbon material produced by the production process of the present invention has a small pore volume and a low bulk density as mentioned above, and accordingly when it is used for forming an electrode, an electrode having a high bulk density and thereby having a large capacitance per volume can be formed.

The electrode for an electric double layer capacitor of the present invention comprises, more specifically, the above carbon material and a binder, and an electrical conductivity-imparting material as the case requires. This electrode is formed, for example, in such a manner that a powder of the carbon material of the present invention and a binder such as polytetrafluoroethylene and preferably an electrically conductive material are adequately kneaded in the presence of a solvent such as an alcohol, molded into a plate by e.g. extrusion molding and further formed into a thin sheet by e.g. rolling. After the solvent is dried, the sheet electrode thus obtained is bonded to a current collector by means of e.g. an electrically conductive adhesive to constitute an electrode assembly. Otherwise, a powder of the carbon material and a binder and an electrically conductive material as the case requires may be mixed with a solvent to obtain a slurry, which is then coated on a current collector metal foil, followed by drying to obtain an electrode incorporated with the current collector.

As the binder, in addition to the above polytetrafluoroethylene, polyvinylidene fluoride, a fluoroolefin/vinyl ether copolymerized crosslinked polymer, carboxymethyl cellulose, polyvinyl pyrrolidone, polyvinyl alcohol or polyacrylic acid may, for example, be used, and among them, polytetrafluoroethylene is particularly preferred as the binder in a case where an electrode is in a form of a sheet. Polytetrafluoroethylene is formed into fibers due to stress imparted to the mixture during the kneading, extrusion molding and rolling steps, and these fibers form a three-dimensional network structure to fix the carbon material and the electrical conductivity-imparting material to minimize separation of fine carbon material particles from the electrode sheet, which causes microshort-circuiting when a capacitor is constituted. Further, different from another binder which combines the carbon material or the electrical conductivity-imparting material in a form of a thin film, polytetrafluoroethylene in a state of fibers combines particles of the carbon material or the electrical conductivity-imparting material, whereby the surface of the particles of the carbon material is less likely to be blocked by the binder, and the whole surface can be utilized as the site for presenting the capacitance. As the polytetrafluoroethylene, preferred is one having a molecular weight of at least 1,000,000 is preferred since it is likely to be formed into fibers.

The content of the binder in the electrode is preferably from about 0.5 to about 20 mass % based on the total amount of the activated carbon and the binder. If the content of the binder is less than 0.5 mass %, the strength of the electrode tends to be inadequate, and if it exceeds 20 mass %, the electrical resistance tends to increase and the capacitance tends to decrease. The amount of the binder incorporated is more preferably from 0.5 to 10 mass %, from the viewpoint of the balance between the capacitance and the strength of the electrode. Here, as a crosslinking agent for the crosslinked polymer, an amine, a polyamine, a polyisocyanate, a bisphenol or a peroxide is preferred.

The carbon material obtained by the process of the present invention is a graphitizable carbon, in which fine crystals of graphite are relatively developed, whereby the electrical resistance of the carbon itself is low, and it is not necessarily required to add an electrical conductivity-imparting material. However, in a case where the internal resistance of a capacitor is required to be extremely low, such as a case of a capacitor for large current discharging, it is preferred to add an electrical conductivity-imparting material to reduce the internal resistance of the electrode. As the electrical conductivity-imparting material, a powder of e.g. carbon black, natural graphite, artificial graphite, titanium oxide or ruthenium oxide may be used. Among them, ketjen black or acetylene black as one type of carbon black is preferably used since the effect to improve electrical conductivity is significant with a small amount.

In a case where the electrical conductivity-imparting material is added, the amount is preferably at least 1 mass %, particularly preferably at least 5 mass %, based on the total amount of the carbon material particles and the electrical conductivity-imparting material. If the amount is too small, the effect to reduce the resistance of the electrode tends to be small, and if the amount is too large, the proportion of the carbon material incorporated will decrease relatively, whereby the capacitance of the electrode will decrease, and accordingly, the incorporated amount is preferably at most 30 mass %, particularly preferably at most 15 mass %.

The solvent for forming a slurry is preferably one capable of dissolving the above binder, and e.g. N-methylpyrrolidone, dimethylformamide, toluene, xylene isophorone, methyl ethyl ketone, ethyl acetate, methyl acetate, ethyl acetate, dimethyl phthalate, methanol, ethanol, isopropanol, butanol or water may optionally be selected.

According to the present invention, an electric double layer capacitor comprising the above electrode having an increased capacitance per volume is further provided. The electrode comprising a carbon material and a binder, or the electrode comprising a carbon material, an electrical conductivity-imparting material and a binder, is incorporated with a current collector, and a pair of the electrodes is disposed so that the electrodes face each other by means of a separator interposed therebetween, and is impregnated with an electrolytic solution to form a base unit of a capacitor.

The current collector to be incorporated with the electrode may be any current collector so long as it has electrochemical and chemical corrosion resistance. As the current collector for the electrode consisting mainly of the carbon material, stainless steel, aluminum, titanium, tantalum or nickel may, for example, be used. Among them, stainless steel and aluminum are preferred from the viewpoint of both performance and price.

The current collector may be in a form of a foil, may be a foam metal of nickel or aluminum having a three-dimensional structure, or may be a net or a wool of stainless steel.

As the electrolytic solution to be used for an electric double layer capacitor of the present invention, a known aqueous or organic electrolytic solution may be used, but preferred is an organic electrolytic solution since the amount of energy accumulated per unit volume tends to increase. The decomposition voltage of an organic electrolytic solution is at least twice that of an aqueous electrolytic solution, and accordingly it is favorable to use an organic electrolytic solution from the viewpoint of the energy density, which is proportional to half of the product of the capacitance and the square of the voltage.

As the organic solvent, it is preferred to use at least one solvent selected from the group consisting of electrochemically stable ethylene carbonate, propylene carbonate, butylene carbonate, γ-butyrolactone, sulfolane, a sulfolane derivative, 3-methylsulfolane, 1,2-dimethoxyethane, acetonitrile, glutaronitrile, valeronitrile, dimethylformamide, dimethylsulfoxide, tetrahydrofuran, dimethoxyethane, methylformate, dimethyl carbonate, diethyl carbonate and ethyl methyl carbonate. They may be used as a mixture.

As the electrolyte for the organic electrolytic solution, preferred is a salt comprising a quaternary onium cation represented by $R^1R^2R^3R^4N^+$ or $R^1R^2R^3R^4P^+$ (wherein each of $R^1$, $R^2$, $R^3$ and $R^4$ which are independent of one another, is a $C_{1-6}$ alkyl group) and an anion selected form the group consisting of $BF_4^-$, $PF_4^-$, $ClO_4^-$, $CF_3SO_3^-$ and $(SO_2R^5)$ $(SO_2R^6)N^-$ (wherein each of $R^5$ and $R^6$ which are independent of each other, is a $C_{1-4}$ alkyl group or alkylene group, and $R^5$ and $R^6$ may form a ring)

Specific examples of the preferred electrolyte include $(C_2H_5)_4NBF_4$, $(C_2H_5)_3(CH_3)NBF_4$, $(C_2H_5)_4PBF_4$ and $(C_2H_5)_3(CH_3)PBF_4$. The concentration of such a salt in the electrolytic solution is preferably from 0.1 to 2.5 mol/l, more preferably from about 0.5 to about 2 mol/l.

As the separator to be interposed between the positive electrode and the negative electrode, a non-woven fabric or a paper sheet using e.g. polypropylene fiber, polyethylene terephthalate fiber, glass fiber or synthetic cellulose, a mixed non-woven fabric or a mixed paper sheet of such fibers, or a porous film of e.g. polypropylene or polytetrafluoroethylene, may, for example, be suitably used. A porous film is particularly preferred since it has a high strength, a large breaking extension and a low resistance.

The electric double layer capacitor of the present invention may have any structure of a coin type wherein a pair of sheet electrodes with a separator interposed therebetween is accommodated in a metal casing together with an electrolytic solution, a wound type wherein a pair of positive and negative electrodes is wound with a separator interposed therebetween, and a laminate type wherein a plurality of sheet electrodes are laminated with a separator interposed therebetween.

Now, the present invention will be explained in further detail with reference to Examples and Comparative Examples. However, it should be understood that the present invention is by no means restricted to such specific Examples. Here, the material, carbonization and activation conditions and physical properties of the carbon material after the activation in each Example are shown in Table 1, the conditions of imparting mechanical impact force and physical properties of the carbon material thus obtained are shown in Table 2, and the electrode density and the properties of the capacitor are shown in Table 3.

EXAMPLE 1

A commercially available petroleum coke, after its particle diameters were adjusted to about 3 mm, was carbonized by a heat treatment in an atmosphere of nitrogen at 800° C. for 3 hours. The volatile component in the carbonized product was measured by a method as stipulated in JIS M 8812, whereupon it was 3.2 mass %. Then, potassium hydroxide grains were added thereto in an amount of 3 times the mass of the carbonized product, followed by well mixing, and the mixture was put in a corrosion resistant alloy crucible, followed by heating in an atmosphere of nitrogen gas at 800° C. for 5 hours to carry out an activation treatment. After the completion of the treatment, an operation comprising washing with water and neutralization with hydrochloric acid was repeatedly carried out to bring the residual amount of potassium in the carbon material to be 500 ppm. The pore volume of the carbon material in this state was 0.9 cm³/g, and the mean particle diameter was 30 µm. 20 g of the carbon material thus obtained and 2,000 g of zirconia balls were charged into an alumina container having an internal volume of 0.7 l, the container was set in a vibration mill, and impact force with an acceleration of gravity of 6 G was imparted thereto for 60 minutes to carry out a treatment to reduce the pore volume. After the completion of the treatment, the carbon material had a pore volume of 0.4 cm³/g and a mean particle diameter of 3.5 µm. The reduction ratio of the pore volume was 44% by impartment of mechanical impact force.

Further, the amount of functional groups on the surface of the obtained carbon material was measured, and it was 0.35 meq./g.

Then, a mixture consisting of 80 mass % of the obtained carbon material, 10 mass % of KETJENBLACK EC which is one type of carbon black as an electrical conductivity-imparting material and 10 mass % of a polytetrafluoroethylene powder having a molecular weight of 1,000,000 as a binder, was kneaded while adding ethanol thereto, so that the polytetrafluoroethylene powder was formed into fibers by shear force. Then, the obtained mixture was rolled to obtain an electrode sheet having a thickness of 0.2 mm, which was dried under vacuum at 200° C. for 2 hours. Then, in dry air, two electrodes having a diameter of 20 mm were punched from the sheet, the mass was measured, and the bulk density of the electrode was obtained from the relation between the outside dimension and the mass, and it was 0.78 g/cm³.

Then, these two electrodes as a positive electrode and a negative electrode, were respectively bonded to an aluminum sheet as a current collector by means of a graphite type electrically conductive adhesive. Then, the positive and negative electrodes bonded to the aluminum sheet were dried under vacuum at 250° C. for 4 hours, and impregnated with a propylene carbonate solution containing $(C_2H_5)_3(CH_3)NBF_4$ at a concentration of 1 mol/l in an atmosphere of dry argon. Then, the two electrodes were disposed so that they faced each other by means of a separator made of glass fiber non-woven fabric, and the electrodes were sandwiched between two glass sheets and constricted under a constant pressure and then fixed.

A voltage of 2.5 V was applied to the accomplished model capacitor cell, and the capacitance (synthetic capacitance of positive and negative electrodes) and the internal resistance were measured, whereupon they were 3.3 F and 2.3 Ω, respectively.

Further, charging and discharging at a constant current of 1 A within a voltage of from 0 to 2.5 V were repeatedly carried out for 3,000 cycles in a constant temperature chamber in an atmosphere of argon at 40° C., and the capacitance and the internal resistance after the 3,000 cycles were measured to evaluate the rate of change in performance. As a result, the reduction ratio of capacitance was 10%, and the ratio of increase in the internal resistance was +13%.

EXAMPLE 2

A carbon material was obtained in the same manner as in Example 1 except that the temperature during activation was 900° C. The obtained carbon material was washed under exactly the same condition as in Example 1 and evaluated in the same manner as in Example 1. The results are shown in Table 1. The carbon material thus obtained was subjected to the treatment to reduce the pore volume in exactly the same manner as in Example 1 except that the treatment time was 90 minutes. Physical properties of the obtained carbon material are shown in Table 2.

Using this carbon material, an electrode was prepared and evaluated in the same manner as in Example 1. Further, using this electrode, a model capacitor cell was prepared and evaluated in the same manner as in Example 1. The results are shown in Table 3.

EXAMPLE 3

A carbon material was obtained in exactly the same manner as in Example 1 except that the carbon material after the treatment to reduce the pore volume obtained in Example 1 was subjected to a heat treatment in an atmosphere of argon at 600° C. for 4 hours. The obtained carbon material was evaluated in the same manner as in Example 1, and the results are shown in Tables 1 and 2.

Using the carbon material, an electrode was prepared and evaluated in the same manner as in Example 1. Further, using this electrode, a model capacitor cell was prepared and evaluated in the same manner as in Example 1. The results are shown in Table 3.

EXAMPLE 4

A commercially available coal type pitch having a softening point of 300° C. was subjected to a heat treatment in an atmosphere of nitrogen at 800° C. for 3 hours to obtain a carbonized product having a volatile component of 4.1 mass %. The particle diameters of the carbonized product were adjusted to about 3 mm by a jaw crusher, then potassium hydroxide grains in an amount of 4 times the mass of the carbonized product were added to the carbonized product, followed by well mixing, and the mixture was put in a corrosion resistant alloy crucible, followed by heating in an atmosphere of nitrogen gas at 850° C. for 5 hours to carry out an activation treatment. After the completion of the treatment, an operation comprising washing with water and washing with an acid was repeatedly carried out, and then the carbon material thus obtained was evaluated in the same manner as in Example 1. The results are shown in Table 1.

The carbon material thus obtained was subjected to a treatment to reduce the pore volume under exactly the same condition as in Example 1 except that the treatment time was 90 minutes. Physical properties of the carbon material thus obtained are shown in Table 2.

Using the carbon material, an electrode was prepared and evaluated in the same manner as in Example 1. Further, using this electrode, a model capacitor cell was prepared and evaluated in the same manner as in Example 1. The results are shown in Table 3.

EXAMPLE 5

Commercially available mesocarbon microbeads (MCMB) having a mean particle diameter of 20 μm were carbonized in an atmosphere of nitrogen at 750° C. for 4 hours to obtain a carbonized product having a volatile component of 5.8 mass %. Then, sodium hydroxide grains in an amount of 4 times the mass of the carbonized product were added thereto, followed by well mixing, and the mixture was put in a corrosion resistant alloy crucible, followed by heating in an atmosphere of nitrogen gas at 900° C. for 5 hours to carry out an activation treatment. After the completion of the treatment, an operation comprising washing with water and washing with an acid was repeatedly carried out, and the carbon material thus obtained was evaluated in the same manner as in Example 1. The results are shown in Table 1.

10 g of the carbon material thus obtained and 800 g of zirconia balls were put in an alumina container having an internal volume of 0.3 l, the container was set in a planetary mill, and an impact force with an acceleration of gravity of 80 G was imparted thereto for 10 minutes to carry out a treatment to reduce the pore volume. The carbon material after the completion of the treatment was further subjected to a heat treatment under vacuum at 550° C. for 3 hours. Physical properties of the obtained carbon material are shown in Table 2.

Using this carbon material, an electrode was prepared and evaluated in the same manner as in Example 1. Further, by using this electrode, a model capacitor cell was prepared and evaluated in the same manner as in Example 1. The results are shown in Table 3.

COMPARATIVE EXAMPLE 1

The carbon material after activation and washing obtained in Example 1 was not subjected to the treatment to reduce the pore volume. Physical properties of the obtained carbon material are shown in Table 2.

Using this carbon material, an electrode was prepared and evaluated in the same manner as in Example 1. Further, using this electrode, a model capacitor cell was prepared and evaluated in the same manner as in Example 1. The results are shown in Table 3.

COMPARATIVE EXAMPLE 2

The carbon material after activation and washing obtained in Example 1 was subjected to a heat treatment in a stream of nitrogen at 900° C. for 5 hours. The obtained carbon material was evaluated in the same manner as in Example 1, and the results are shown in Tables 1 and 2.

Using this carbon material, an electrode was prepared and evaluated in the same manner as in Example 1. Further, using this electrode, a model capacitor cell was prepared and evaluated in the same manner as in Example 1. The results are shown in Table 3.

COMPARATIVE EXAMPLE 3

An activated product was obtained in exactly the same manner as in Example 4 except that the temperature during activation was 750° C. The obtained activated product was washed three times the washing times in Example 4. The carbon material thus obtained was evaluated in the same manner as in Example 1. The results are shown in Table 1.

The obtained carbon material was subjected to a grinding treatment by using a rotary ball mill. The grinding was carried out by putting 20 g of the carbon material and 1,000 g of alumina balls in a container having an internal volume of 0.7 l, followed by rotation for 12 hours by dry method. Physical properties of the obtained carbon material are shown in Table 2.

Using this carbon material, an electrode was prepared and evaluated in the same manner as in Example 1. Further, using this electrode, a model capacitor cell was prepared and evaluated in the same manner as in Example 1. The results are shown in Table 3.

COMPARATIVE EXAMPLE 4

20 g of the carbon material activated and washed obtained in Example 5 and 1,300 g of zirconia balls were put in a container of 0.7 l, and a treatment to reduce the pore volume was carried out for 48 hours by using a rotary ball mill. The obtained carbon material was evaluated in the same manner as in Example 1. The results are shown in Tables 1 and 2.

Using this carbon material, an electrode was prepared and evaluated in the same manner as in Example 1. Further, using this electrode, a model capacitor cell was prepared and evaluated in the same manner as in Example 1. The results are shown in Table 3.

TABLE 1

| | Material | Carbonization conditions (° C. × hr.) | Volatile component (mass %) | Activation conditions Temp. × hr. | KOH/C | Pore volume cm³/g | Mean particle diameter μm | K conc. ppm |
|---|---|---|---|---|---|---|---|---|
| Ex. 1 | Petroleum coke | 800 × 3 | 3.20% | 800 × 5 | 3 | 0.9 | 30 | 500 |
| Ex. 2 | ↑ | ↑ | ↑ | 900 × 5 | ↑ | 1.4 | 25 | 100 |
| Ex. 3 | ↑ | ↑ | ↑ | 800 × 5 | ↑ | 0.9 | 30 | 500 |
| Ex. 4 | Coal type pitch | ↑ | 4.10% | 850 × 5 | 4 | 1.3 | 50 | 120 |
| Ex. 5 | MCMB | 750 × 4 | 5.80% | 900 × 5 | 4 | 1.4 | 19 | 600 |
| Comp. Ex. 1 | Petroleum coke | 800 × 3 | 3.20% | 800 × 5 | 3 | 0.9 | 30 | 500 |
| Comp. Ex. 2 | ↑ | ↑ | ↑ | ↑ | ↑ | ↑ | ↑ | ↑ |
| Comp. Ex. 3 | Coal type pitch | ↑ | 4.10% | 750 × 5 | 4 | 0.3 | 85 | 3000 |
| Comp. Ex. 4 | MCMB | 750 × 4 | 5.80% | 900 × 5 | 4 | 1.4 | 19 | 600 |

TABLE 2

| | Conditions of mechanical impact force impartment | | | Physical properties of carbon material | | | |
|---|---|---|---|---|---|---|---|
| | Means | Time | Heat treatment Temp. × hr. | Mean particle diameter μm | Pore volume cm³/g | Functional groups on the surface meq./g | Reduction ratio of pores % |
| Ex. 1 | Vibration mill | 60 minutes | Nil | 3.5 | 0.4 | 0.35 | 44 |
| Ex. 2 | ↑ | 90 minutes | ↑ | 3.1 | 0.37 | 0.45 | 26 |
| Ex. 3 | ↑ | 60 minutes | 600 × 4 | 3.5 | 0.38 | 0.21 | 42 |
| Ex. 4 | ↑ | 90 minutes | Nil | 4.2 | 0.48 | 0.42 | 37 |
| Ex. 5 | Planetary mill | 10 minutes | 550 × 3 | 2.4 | 0.3 | 0.25 | 21 |
| Comp. Ex. 1 | Nil | Nil | Nil | 30 | 0.9 | 0.29 | 100 |
| Comp. Ex. 2 | ↑ | ↑ | 900 × 5 | 28 | 0.35 | 0.05 | 39 |
| Comp. Ex. 3 | Ball mill | 12 hours | Nil | 2.1 | 0.29 | 0.51 | 97 |
| Comp. Ex. 4 | ↑ | 24 hours | Nil | 0.8 | 1.2 | 0.60 | 86 |

Reduction ratio of pores (%) = (pore volume after the treatment)/(pore volume before the treatment) × 100

TABLE 3

| | Properties of capacitor | | | |
|---|---|---|---|---|
| | Electrode density g/cm³ | Capacitance F | Resistance Ω | Capacitance reduction ratio % | Resistance increasing ratio % |
| Ex. 1 | 0.78 | 3.3 | 2.3 | 10 | 13 |
| Ex. 2 | 0.80 | 3.6 | 2.5 | 15 | 15 |
| Ex. 3 | 0.79 | 3.4 | 2.5 | 8 | 7 |
| Ex. 4 | 0.70 | 3.1 | 2.2 | 20 | 16 |
| Ex. 5 | 0.82 | 3.2 | 2.8 | 12 | 15 |
| Comp. Ex. 1 | 0.56 | 2.4 | 2.8 | 13 | 16 |
| Comp. Ex. 2 | 0.70 | 0.9 | 10.5 | 5 | 10 |
| Comp. Ex. 3 | 0.89 | 1.0 | 12.3 | 50 | 60 |
| Comp. Ex. 4 | 0.60 | 1.9 | 2.2 | 58 | 61 |

With respect to the carbon material obtained by the process of the present invention, the pore volume is optimized by a step to reduce the pore volume in the production process. Accordingly, by using this carbon material, an electrode having a high density can be obtained, and an electric double layer capacitor having a large capacitance per volume can be provided. Further, in the carbon material obtained by the process of the present invention, the amount of impurities and the amount of functional groups on the surface are suppressed to low levels, and accordingly an electric double layer capacitor using the carbon material as an electrode material will be excellent in durability.

The entire disclosure of Japanese Patent Application No. 2000-100859 filed on Apr. 3, 2000 including specification, claims and summary are incorporated herein by reference in its entirety.

What is claimed is:

1. A process for producing a carbon material for an electric double layer capacitor electrode, which comprises:
    activating a graphitizable carbon or a graphitizable carbon source to have its pore volume in the range of 0.6 to 1.5 cm$^3$/g; and
    imparting mechanical impact force to the graphitizable carbon or the graphitizable carbon source activated in the activating step to reduce the pore volume to at most 75% of that before the mechanical impact force is imparted.

2. The process according to claim 1, wherein the activation is carried out by subjecting the graphitizable carbon or the graphitizable carbon source to a heat treatment in a non-oxidizing atmosphere in the coexistence of an alkali metal compound.

3. The process according to claim 1, wherein the graphitizable carbon or the graphitizable carbon source is petroleum coke or coal pitch coke.

4. The process according to claim 1, wherein the acceleration of gravity is greater than 1 G when the mechanical impact force is imparted.

5. The process according to claim 1, wherein the mean particle diameter of the carbon material for an electric double layer capacitor electrode is from 2 to 20 μm.

6. The process according to claim 1, wherein the amount of alkali metal impurities contained in the carbon material for an electric double layer capacitor electrode is at most 2,000 ppm.

7. The process according to claim 1, wherein the amount of functional groups on the surface of the carbon material for an electric double layer capacitor electrode is from 0.1 to 0.5 meq./g.

8. A process for producing a carbon material for an electric double layer capacitor electrode, which comprises:
    activating a graphitizable carbon or a graphitizable carbon source to have its pore volume in the range of 0.6 to 1.5 cm$^3$/g; and
    imparting mechanical impact force to the graphitizable carbon or the graphitizable carbon source activated in the activating step to reduce the pore volume to at least 0.1 cm$^3$/g and less than 0.6 cm$^3$/g.

9. The process according to claim 8, wherein the activation is carried out by subjecting the graphitizable carbon or the graphitizable carbon source to a heat treatment in a non-oxidizing atmosphere in the coexistence of an alkali metal compound.

10. The process according to claim 8, wherein the graphitizable carbon or the graphitizable carbon source is petroleum coke or coal pitch coke.

11. The process according to claim 8, wherein the acceleration of gravity is greater than 1 G when the mechanical impact force is imparted.

12. The process according to claim 8, wherein the mean particle diameter of the carbon material for an electric double layer capacitor electrode is from 2 to 20 μm.

13. The process according to claim 8, wherein the amount of alkali metal impurities contained in the carbon material for an electric double layer capacitor electrode is at most 2,000 ppm.

14. The process according to claim 8, wherein the amount of functional groups on the surface of the carbon material for an electric double layer capacitor electrode is from 0.1 to 0.5 meq./g.

15. A process for producing a carbon material for an electric double layer capacitor electrode, which comprises:
    activating a graphitizable carbon or a graphitizable carbon source to have its pore volume in the range of 0.6 to 1.5 cm$^3$/g; and
    imparting mechanical impact force to the graphitizable carbon or the graphitizable carbon source activated in the activating step to reduce the pore volume to at most 75% of that before the mechanical impact force is imparted, and at least 0.1 cm$^3$/g and less than 0.6 cm$^3$/g.

16. The process according to claim 15, wherein the activation is carried out by subjecting the graphitizable carbon or the graphitizable carbon source to a heat treatment in a non-oxidizing atmosphere in the coexistence of an alkali metal compound.

17. The process according to claim 15, wherein the graphitizable carbon or the graphitizable carbon source is petroleum coke or coal pitch coke.

18. The process according to claim 15, wherein the acceleration of gravity is greater than 1 G when the mechanical impact force is imparted.

19. A process for producing an electric double layer capacitor electrode, which comprises:
    activating a graphitizable carbon or a graphitizable carbon source to have its pore volume in the range of 0.6 to 1.5 cm$^3$/g;
    imparting mechanical impact force to the graphitizable carbon or the graphitizable carbon source activated in the activating step to reduce the pore volume to at most 75% of that before the mechanical impact force is imparted; and
    forming said carbon material and a binder into the electric double layer capacitor electrode.

20. The process according to claim 19, wherein polytetrafluoroethylene as the binder is formed into fibers to produce the electrode, and the bulk density of the electrode is brought to be from 0.6 to 1.0 g/cm$^3$.

21. The process according to claim 19, wherein the activation is carried out by subjecting the graphitizable carbon or the graphitizable carbon source to a heat treatment in a non-oxidizing atmosphere in the coexistence of an alkali metal compound.

22. The process according to claim 19, wherein the graphitizable carbon or the graphitizable carbon source is petroleum coke or coal pitch coke.

23. The process according to claim 19, wherein the acceleration of gravity is greater than 1 G when the mechanical impact force is imparted.

24. A process for producing an electric double layer capacitor electrode, which comprises:
    activating a graphitizable carbon or a graphitizable carbon source to have its pore volume in the range of 0.6 to 1.5 cm$^3$/g;
    imparting mechanical impact force to the graphitizable carbon or the graphitizable carbon source activated in the activating step to reduce the pore volume to at least 0.1 cm$^3$/g and less than 0.6 cm$^3$/g; and
    forming said carbon material and a binder into the electric double layer capacitor electrode.

25. The process according to claim 24, wherein polytetrafluoroethylene as the binder is formed into fibers to produce the electrode, and the bulk density of the electrode is brought to be from 0.6 to 1.0 g/cm$^3$.

26. The process according to claim 24, wherein the activation is carried out by subjecting the graphitizable carbon or the graphitizable carbon source to a heat treatment in a non-oxidizing atmosphere in the coexistence of an alkali metal compound.

27. The process according to claim 24, wherein the graphitizable carbon or the graphitizable carbon source is petroleum coke or coal pitch coke.

28. The process according to claim 24, wherein the acceleration of gravity is greater than 1 G when the mechanical impact force is imparted.

29. A process for producing an electric double layer capacitor electrode, which comprises:

activating a graphitizable carbon or a graphitizable carbon source to have its pore volume in the range of 0.6 to 1.5 $cm^3/g$;

imparting mechanical impact force to the graphitizable carbon or the graphitizable carbon source activated in the activating step to reduce the pore volume to at most 75% of that before the mechanical impact force is imparted, and at least 0.1 $cm^3/g$ and less than 0.6 $cm^3/g$; and forming said carbon material and a binder into the electric double layer capacitor electrode.

30. A process for producing an electric double layer capacitor having an electrolytic solution and electrodes containing a carbon material and a binder, said process comprising:

activating a graphitizable carbon or a graphitizable carbon source to have its pore volume in the range of 0.6 to 1.5 $cm^3/g$;

imparting mechanical impact force to the graphitizable carbon or the graphitizable carbon source activated in the activating step to reduce the pore volume to at least 0.1 $cm^3/g$ and less than 0.6 $cm^3/g$;

forming said carbon material and a binder into the electrodes.

31. A process for producing an electric double layer capacitor having an electrolytic solution and electrodes containing a carbon material and a binder, said process comprising:

activating a graphitizable carbon or a graphitizable carbon source to its pore volume in the range of 0.6 to 1.5 $cm^3/g$;

imparting mechanical impact force to the graphitizable carbon or the graphitizable carbon source activated in the activating step to reduce the pore volume to at most 75% of that before the mechanical impact force is imparted, forming said carbon material and a binder into the electrodes.

32. A process for producing an electric double layer capacitor having an electrolytic solution and electrodes containing a carbon material and a binder, said process comprising:

activating a graphitizable carbon or a graphitizable carbon source to have its pore volume in the range of 0.6 to 1.5 $cm^3/g$;

imparting mechanical impact force to the graphitizable carbon or the graphitizable carbon source activated in the activating step to reduce the pore volume to at most 75% of that before the mechanical impact force is imparted, and at least 0.1 $cm^3/g$ and less than 0.6 $cm^3/g$; and forming said carbon material and a binder into the electrodes.

* * * * *